Figure 1:
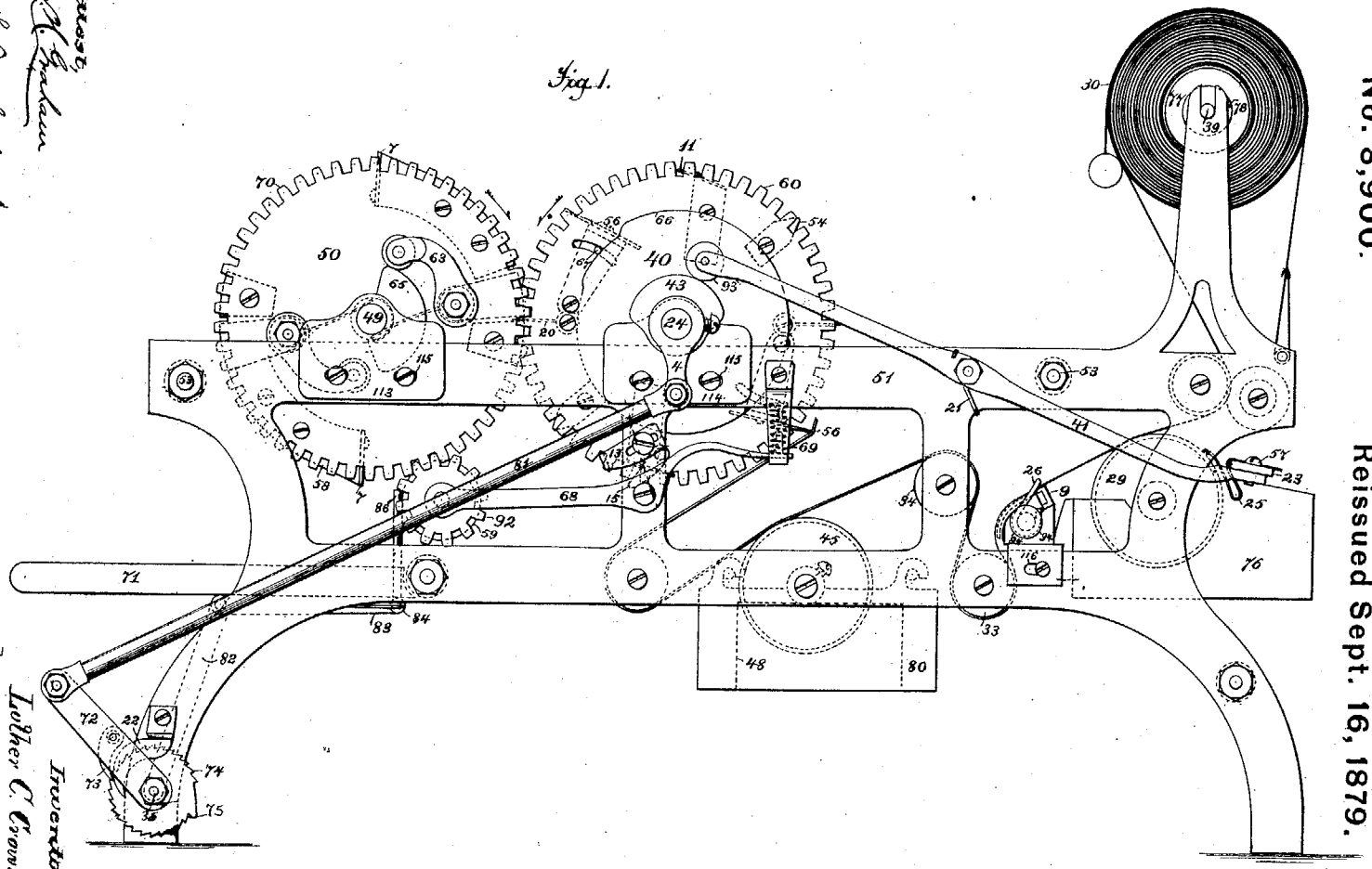

5 Sheets—Sheet 1.

L. C. CROWELL,

Assignor to the UNION PAPER BAG MACHINE Co.

Paper-Bag Machine.

No. 8,900. Reissued Sept. 16, 1879.

Witnesses,
Geo. H. Graham
W. L. Aughinbaugh.

Inventor,
Luther C. Crowell.
by Munson & Philipp
Attys.

THE NORRIS PETERS CO., PHOTO-LITHO., WASHINGTON, D. C.

5 Sheets—Sheet 2.

L. C. CROWELL,

Assignor to the UNION PAPER BAG MACHINE Co.

Paper-Bag Machine.

No. 8,900. Reissued Sept. 16, 1879.

Witnesses:
Geo. H. Graham
W. L. Auchinbaugh

Inventor,
Luther C. Crowell,
by Munson & Philipp,
Attys.

THE NORRIS PETERS CO., PHOTO-LITHO., WASHINGTON, D. C.

5 Sheets—Sheet 3.

L. C. CROWELL,

Assignor to the UNION PAPER BAG MACHINE CO.

Paper-Bag Machine.

No. 8,900. Reissued Sept. 16, 1879.

Attest,
Geo. H. Graham.
W. L. Aughinbaugh.

Inventor,
Luther C. Crowell,
by Munson & Philipp
Atty's.

THE NORRIS PETERS CO., PHOTO-LITHO., WASHINGTON, D. C.

5 Sheets—Sheet 4.

L. C. CROWELL,

Assignor to the UNION PAPER BAG MACHINE CO.

Paper-Bag Machine.

No. 8,900. Reissued Sept. 16, 1879.

Attest,

G. M. Graham

W. L. Aughinbaugh.

Inventor,

Luther C. Crowell, by Munson & Philipp,

Attys.

THE NORRIS PETERS CO., PHOTO-LITHO., WASHINGTON, D. C.

L. C. CROWELL,

Assignor to the UNION PAPER BAG MACHINE Co.

Paper-Bag Machine.

No. 8,900. Reissued Sept. 16, 1879.

*Attest,*
Geo. H. Graham
W. L. Aughinbaugh.

*Inventor,*
Luther C. Crowell,
by Munn & Philipp,
Atty's.

THE NORRIS PETERS CO., PHOTO-LITHO., WASHINGTON, D. C.

UNITED STATES PATENT OFFICE.

LUTHER C. CROWELL, OF BOSTON, MASSACHUSETTS, ASSIGNOR TO THE UNION PAPER BAG MACHINE COMPANY.

IMPROVEMENT IN PAPER-BAG MACHINES.

Specification forming part of Letters Patent No. 143,674, dated October 14, 1873; Reissue No. 8,900, dated September 16, 1879; application filed November 18, 1878.

*To all whom it may concern:*

Be it known that I, LUTHER C. CROWELL, of Boston, in the county of Suffolk and State of Massachusetts, have invented certain Improvements in Paper-Bag Machines; and I do hereby declare that the following specification, when taken in connection with the drawings which accompany and form part of the same, is a description of my invention sufficient to enable those skilled in the art to practice it.

Letters Patent of the United States No. 137,533, dated April 8, 1873, have been granted to me for an improvement in the manufacture of paper bags, said improvement consisting, particularly, in forming bags from a continuous web of paper, by turning over a narrow lap inwardly at each of the two opposite edges of the web, applying paste on the inner surface of the inwardly-turned lap for half of a bag-forming length of the paper, then applying cement on the outer surface of said inwardly-turned laps for the whole or for half of the bag-forming length, then folding said length by a cross-fold at the center, so as to bring the said inwardly-turned laps at the respective edges together, the bag-length or the length of web having the edges thus inwardly-turned and united being severed from the continuous web, and forming a bag having a whole or uncemented bottom, and having at each edge narrow inwardly-turned laps, which, being pasted together to close the sides, are also pasted to one side, and to one side only, of the main portion of the bag.

My present invention has reference to a machine that will form such bags; and the invention consists in the combination of devices used in said machine, and in the peculiar construction of such devices, all of which will be fully hereinafter described and specifically claimed.

The drawings represent a machine embodying my invention.

Figure 2:
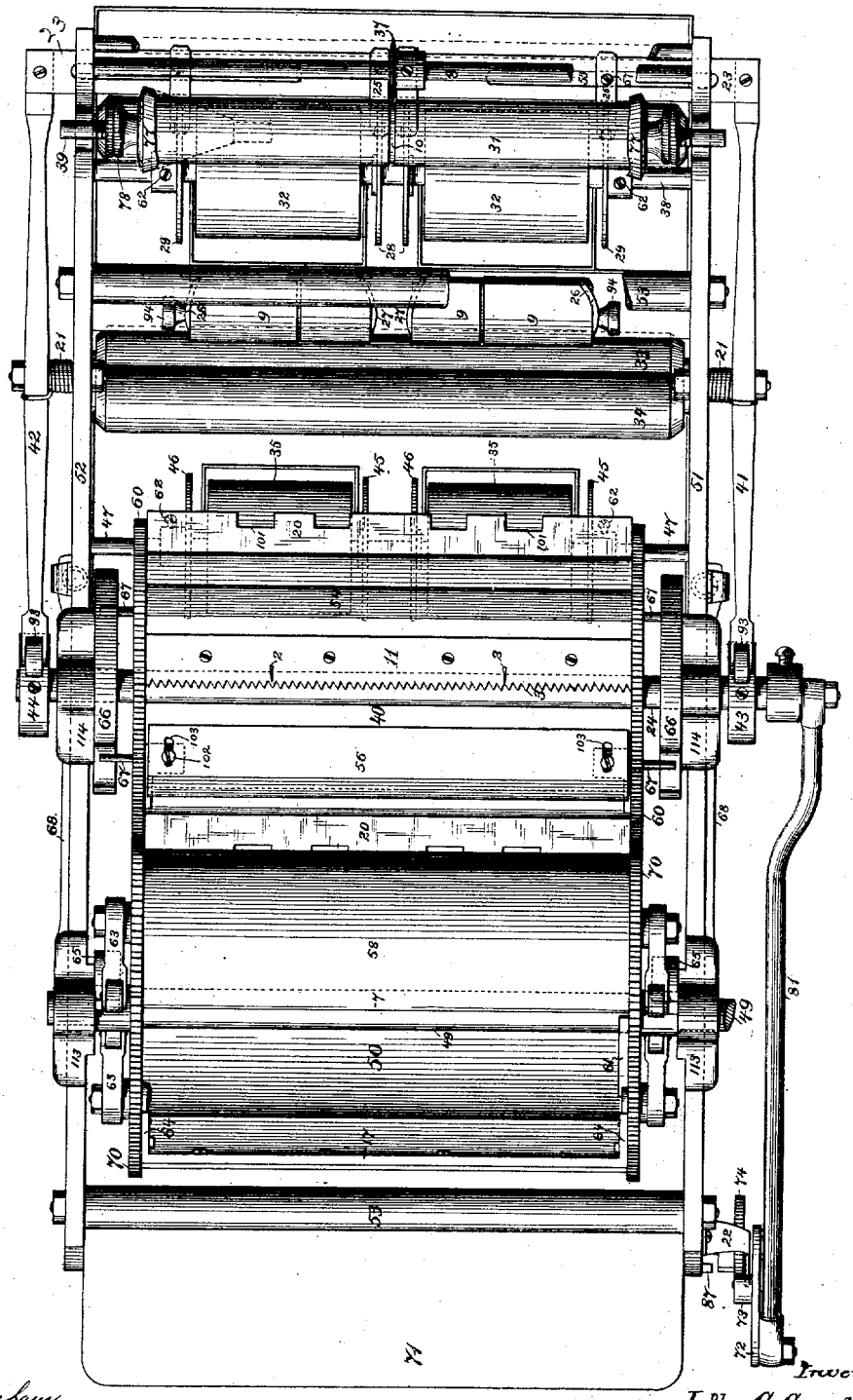
Figure 3:
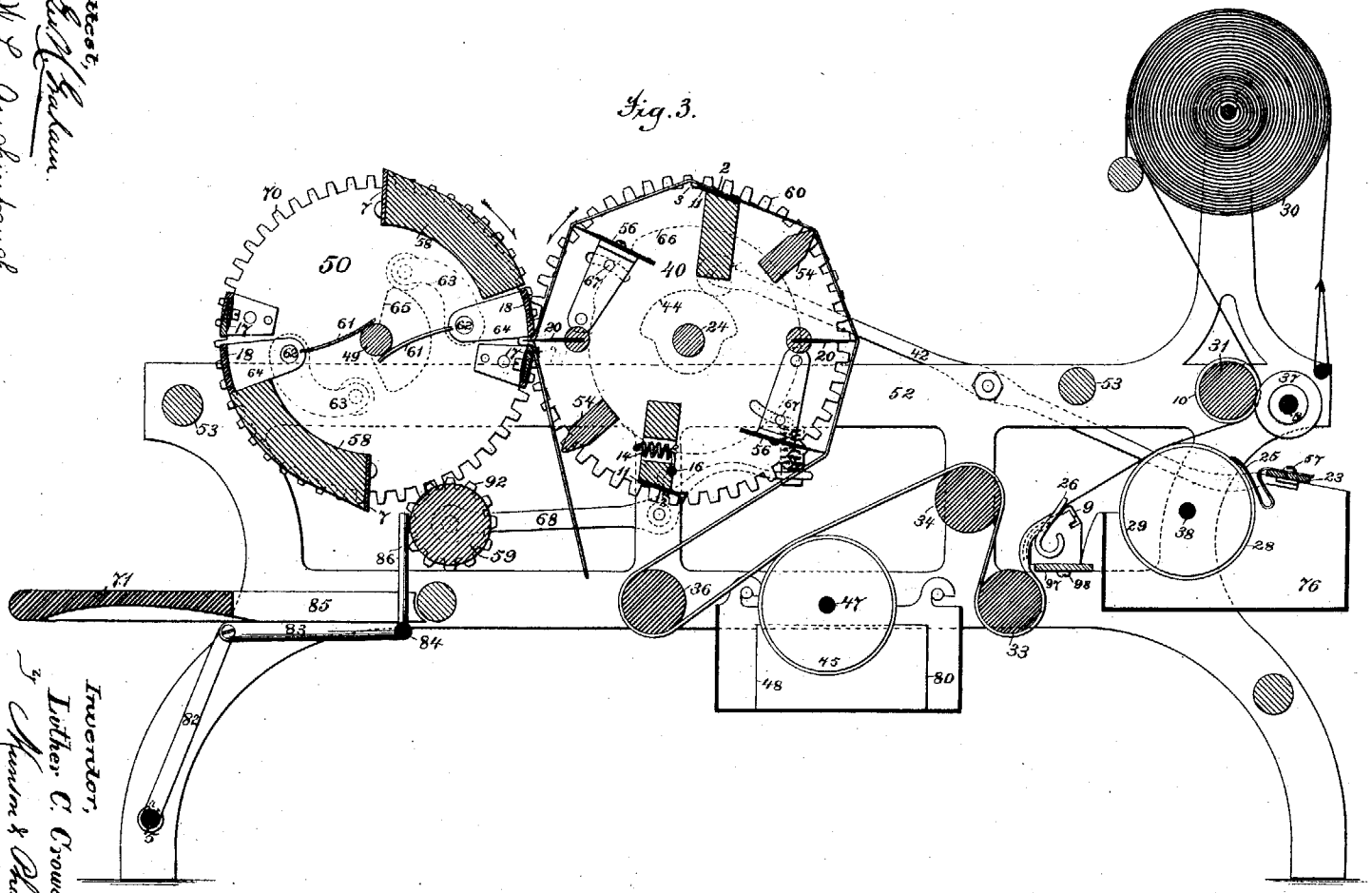
Figure 4:
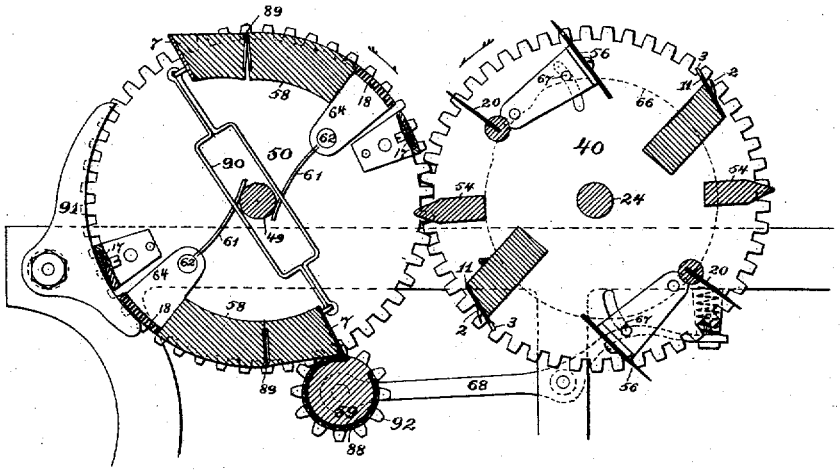
Figure 5:
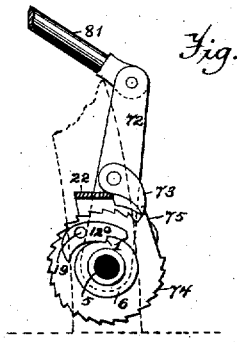
Figure 6:
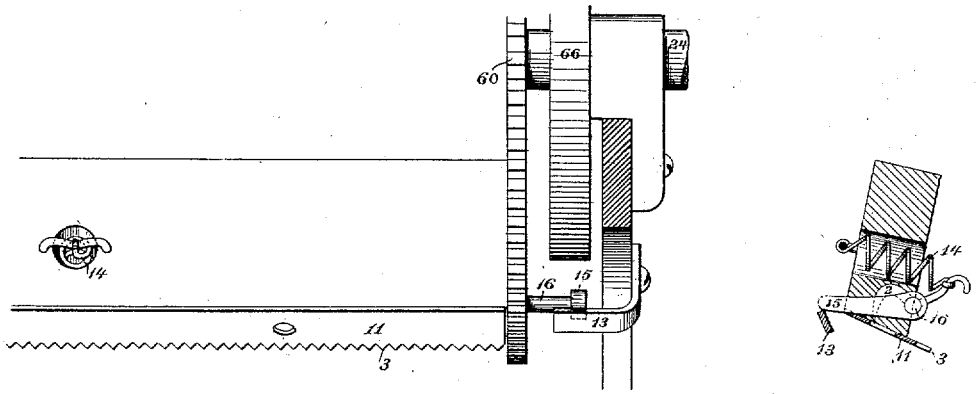
Figure 7:
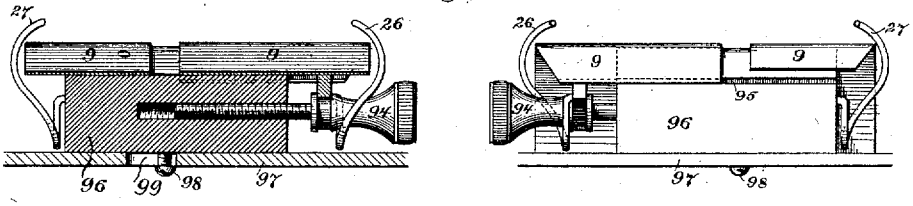
Figure 8:
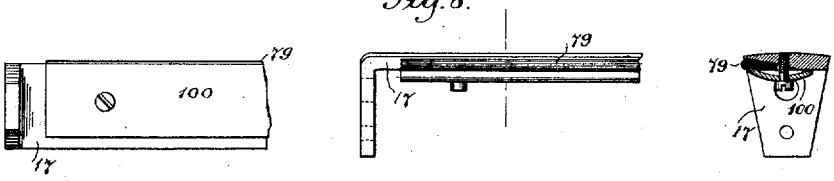

In said drawings, Figure 1 represents a side elevation of the machine. Fig. 2 is a plan view thereof, in which some minor parts are broken away to expose more important devices. Fig. 3 is a longitudinal sectional elevation thereof. Fig. 4 is a sectional elevation of the revolving carriers, showing a modification of one of them. Fig. 5 shows, in detail, the devices for operating the counting and piling mechanism. Fig. 6 shows, by detail views, the devices for automatically projecting and withdrawing the pins. Fig. 7 shows, in detail views, the means for turning over the edges of the web to form laps. Fig. 8 shows, in detail views, the elastic lip with which one of each set of the nipping-jaws is provided.

51 52 denote the two upright side frames, which are connected by suitable cross-rods, 53, thus constituting the frame-work supporting the various rolls and other mechanisms.

At one end of the frame is the roll of paper, 30, which is a continuous web, supported by cones 77 on a shaft, 39, which turns in suitable bearings. These cones 77 77, sliding freely upon said shaft 39, are adjusted by thumb-nuts 78, and thus center or adjust the roll of paper. From this roll the paper web passes over a guide-roll, 31, and thence over twin cylinders 32 32, over twin guide-plates 9 9 and curved turning-fingers 26 27, to and under a guide-roller, 33, thence over a guide-roller, 34, thence over twin cylinders 35 35, to and under a guide-roller, 36, and is carried over one and between the two rotating carriers 40 50, which support mechanisms for folding and severing the web transversely and delivering the product, as seen in Fig. 3. In this progress of the web through the machine its edges are inwardly turned over to form narrow laps, and paste is applied to the upper and under surfaces of such laps; the web is severed transversely to form a bag-length; said bag-length is folded transversely, and its parts are pressed together to form a completed product, as will be more particularly hereinafter described.

In this operation a paper web may be used of a width adequate to form one bag or a series of bags, end to end or in one line; or the machine may be made to form several lines of bags, side by side.

The drawings show a machine designed to form from one web of paper two series or lines of bags side by side, the web of paper being of the width of two bags, plus the width of the four inwardly-turned laps at the opposite edges of the two narrow webs cut from the single or main web.

The main web of paper in running from the roll 30 over the roller 31 is subjected to the action of a revolving disk-cutter, 37, fixed on a loosely-rotating shaft, 8, the edge of which disk plays in a peripheral groove, 10, in the roller 31, said roller being also a loose roller. The paper web is thereby divided into two narrow webs, which pass over the twin cylinders 32 32, fixed on a loose shaft, 38.

Beyond the outer ends of each cylinder 32 a paste-applying wheel, 29, is fixed upon its shaft, and beyond the inner ends of each cylinder is fixed a corresponding paste-applying wheel, 28. The edges of these pasting-wheels 29 28 of each cylinder dip as they rotate into a paste-trough, 76, and as the pasting-disks come into contact with the paper webs they apply paste near to the edges thereof.

After leaving the cylinders 32 32 each one of the narrow webs passes over the guide-plate 9 and between two curved turning-fingers, 26 27, which fingers extend over the opposite ends of the guide-plates 9, and operate to bend and fold under the opposite edges of each paper web to form inwardly-turned overlaps while said webs are passing over the guide-plate 9 and down to the guide-roller 33. The webs in passing under this roller 33 have their laps, which are pasted on their inner surfaces, pressed upon and caused to adhere to the main portion or bodies of the webs, which webs, with their now inwardly-turned and pasted laps, thence pass over the guide-roller 34 to the twin cylinders 35 35.

The paste-wheels 29 28 take from the paste-trough a constant supply of paste; but for each bag-forming length paste need only be applied to one-half of such length. I therefore provide for intermittingly and automatically removing the paste from a portion of the edge of each wheel, so that while each bag-length is passing paste will first be applied to one-half of such bag-length, and then the paste will be stripped from the wheel edge, so that in its continued contact with the paper web no paste will be applied thereto while the other half of such bag-length is passing. To accomplish this I combine with each pasting-wheel a doctor or scraper, 25, fixed to and extending from a bar, 23, which bar is shown as supported at the outer ends of levers 41 42, whose inner ends may have friction-rolls 93, that are intermittingly operated by cams 43 44 on the shaft 24 of the carrier 40.

The bar 23 may be raised by springs 21 21, coiled about the fulcrum-shafts of the levers 41 42 when the paste-wheels are to be free from the doctors or scrapers; but when the cams act upon the levers they force down the bar 23 and bring the doctors or scrapers into contact with the edges of the paste-wheels, so that they strip the paste therefrom and provide them with non-coated portions, which cannot apply paste to the paper. The paste-wheels thus apply paste for a length of paper sufficient to form a bag, and then omit to paste for a corresponding length; but as the bag-lengths are severed alternately half-way between the pasted portions, and then half-way between the unpasted portions, the result is that one-half of each bag-length is pasted and one-half unpasted. The opposite edges being then inwardly turned over by the turning-fingers 26 27, the inwardly-turned laps formed thereby will, as they pass over the roller 34, be pressed upon and caused to adhere by their pasted portions to the body of the web, leaving their unpasted portions free or loose.

From the roller 34 each web, with its inwardly-turned and half-pasted laps, passes over one of the twin cylinders 35 35 and in contact with two paste-wheels, 45 46, with which each of said twin cylinders is provided at its opposite ends, the cylinders and wheels being fixed on a loosely-rotating shaft, 47, and the wheels dipping into a paste-trough, 48. The inwardly-turned laps at the edges of the webs being undermost, the pasting-wheels are so placed that these laps ride over them, whereby they apply a continuous line of paste to the outer surface of such laps. (The paste might be applied only to one-half of the length of laps of each bag-forming length; but it is more readily applied continuous or to the whole length.)

In order that the machine may manipulate webs of varying widths, the pasting-wheels are rendered adjustable laterally on their shafts by means of set-screws 62, and the doctors or scrapers 25 are made capable of a like appropriate adjustment in slots 55 in the bar 23, being held in position by means of screws 57. The outer ones of the turning-fingers 26 27 are likewise made adjustable, being attached to a section of the guide-plates 9 9 that slides laterally by means of adjusting thumb-screws 94 in suitable grooves 95 in the supporting-blocks 96, as is best seen in Fig. 7. These supporting-blocks 96 are also adjustable laterally upon their supporting-bar 97 by means of set-screws 98 that move in slots 99, and the supporting-bar 97 is adjustable to and from the cylinders 32 by slots 116 and holding-screws. (See Fig. 1.)

From the paste-wheels each web passes under the roller 36, thence up and over the rotating carrier 40, and down between it and its companion rotating carrier 50. The carrier 40 is mounted upon the shaft 24, and has at its opposite ends toothed wheels 60, which gear with and are driven by similar toothed wheels 70, with which the companion rotating carrier 50 is provided at its opposite ends, which latter carrier is mounted upon the driving-shaft 49; and these shafts 24 and 29 are supported in brackets 113 114, that are adjustable on the side frames by means of slots 115 and holding-screws, as in Fig. 1.

The carrier 40 has extending across it at opposite points two cutter-bars, 11 11, beyond the surface of which project pins 2 2, and the pins of each cutter-bar in turn enter the paper near the leading end of each successive bag-forming length, and draw it forward as the carrier rotates. The carrier 40 also supports two folding or creasing blades, 20 20, placed midway between the cutter-bars 11 11, and also two guide-bars, 54 54, and two slacker-bars, 56 56. The other carrier, 50, supports at opposite points two bed-plates, 58 58, at the rear end of which are secured radially-adjustable plates 7 7. This carrier is also provided near the front ends of the bed-plates 58 58 with movable nipping-jaws 18 18, which coact with stationary jaws 17 17, also supported by said carrier.

As the carriers 40 50 rotate, the edge of each folding or creasing blade 20 enters between the edges of the jaws 17 18 while they stand open, said jaws closing as the blade 20 20 enters. Each jaw 18 is held open normally by suitable springs 61, that bear against arms 64, which, extending from the jaw, are pivoted at 62, and from one or both pivots of said arms extends a rock-arm, 63, that as the blade 20 enters between the jaws 17 18 engages a stationary cam, 65, and closes said jaws, holding them closed until the arm passes the cam, when the springs 61 again force them open. As the paper web passes to the carrier 40 it is impaled upon the pins 2, and such pins draw it forward, laying it over the edge of the blade 20, which engages the paper at the transverse center of a bag-length. As the carriers rotate the edge of this blade 20 doubles or presses the paper between the open jaws 17 18, and the jaw 18 immediately closes upon the paper, while the slacker-bar 56 yields to slacken the paper web as or just before the blade 20 so enters the paper between said jaws. The slacker-bars 56 are capable of nice adjustment in their carrying-arms to suit this operation by means of slots 103 and set-screws 102. (See Fig. 2.)

Each slacker-bar 56 is held outward by two stationary cams, 66 66, (see Fig. 2,) until the blade 20 enters the jaws 17 18 by means of studs 67 67, which project from the opposite ends of each slacker-bar and ride over the peripheries of the said cams, these studs passing over the lower parts of said cams and allowing the inward movement of the slacker-bar in producing the slack of the paper web required, while the middle portion of a bag-length is being entered between the jaws 17 18 by the blade 20. Before the pins 2 2 again impale the paper, the high parts of the cams 66 66 will have again thrown out the slacker-bar.

The jaws 17 18 having nipped the paper at the center of a bag-forming length draw it by its doubled edge or central transverse fold around with the carrier 50, and carry it between the curved outer surface of the jaw 18, bed-plate 58, and a presser-roller, 59, thus laying the two half-lengths of the bag together. After the doubled edge or central fold has passed this pressing-roller, the jaw 18 opens and lets the fold free, the doubled paper being then clamped between the pressing-roller 59 and the bed-plate 58, whereby it is drawn or fed outward, thus carrying the two half-lengths or plies between the surfaces of said roller and bed-plate and pressing them smoothly together as the product is delivered. These stationary jaws 17 (see Fig. 8) are each provided with an elastic lip, 79, constituted by a strip of rubber clamped in place by a back plate, 100. This rubber lip so projects as to seize the paper with an elastic bite, and each folding-blade 20 is recessed at several points, 101, so that when it tucks or doubles the paper into the nip of the jaws 17 18, the folded or doubled edge thereof shall be firmly held by the jaws at the points where the blade is recessed, and hence will not be pulled out of their grasp when the blade 20 is withdrawn.

The leading edge of the bag-length may be simply torn from the impaling-pins 2, or they may be automatically withdrawn therefrom.

To withdraw the pins 2, they may be made to extend from a shaft, 16, having a rock-arm, 15, the shaft being held in position to project the pins by a spring, 14, and the rock-arm 15, striking a detent, 13, as the jaws 17 18 seize the paper, thus rocking the shaft 15 and withdrawing the pins below the surface of the cutter-bar 11.

As the paper passes to the pressing-roller 59 the edge of the plate 7 presses the paper over the projecting toothed edge 3 of the cutter-bar 11, thus severing the paper over such edge, detaching a sheet therefrom, and providing the web of paper with a leading end that is impaled upon and held by the pins 2. As this plate projects beyond the concentric surface of the bed-plate 58 of the carrier 50, the pressing-roller 59 is so hung as to yield when this plate passes it, for which purpose it may be journaled in levers 68, having springs 69, that yield as the bed-plate engages and passes over the said pressing-roller. This roller may, however, be journaled in stationary bearings, in which case the bed-plate 58 will be arranged to yield, as is shown in Fig. 4.

As the paper passes between the roller 59 and bed-plate 58 the folded and paste-supplied edge laps of its halves or plies will be brought into contact at the respective opposite sides of the paper, thereby completing the bag, which, as it passes beyond the roller 59, drops upon a table, 71.

To count the bags as they are delivered, I combine with the machine a mechanism by which the bags, as they are piled or delivered by the roller 59, shall be moved forward whenever the accumulation reaches a certain number. For this purpose I prefer to use a mechanism substantially as follows:

At one end of the shaft 24 is fixed a crank-arm, 4, connected by a rod, 81, to an arm, 72, jointed loosely to a rock-shaft, 5. Jointed to this arm 72 is a pawl, 73, engaging the teeth of a ratchet-wheel, 74, which is also loose upon the shaft, and is or may be held by friction. Fixed upon the shaft 5 is a wheel, 6, as seen in Fig. 5, having in its periphery one notch, 1, into which at proper times drops a drag-pawl, 12, pivoted to the inner side of the ratchet-wheel. At the outer side of the ratchet-wheel is a stationary guard-plate, 22, having a rim concentric with the outer edges or points of the ratchet-teeth, and extending just beyond such teeth. The ratchet, however, has one tooth, 75, which extends beyond the others, and when the pawl 12 comes over such tooth it meshes into it.

At each rotation of the carrier 40 and shaft 24 a certain number of bags are formed and delivered, (the mechanism shown being designed to make two bags in line and two lines of bags,) and at each rotation the pawl-arm 72 is thrown forward, and the shield or guard 22 holds the pawl 73 out of contact with the ratchet until near the end of its stroke. It then, passing beyond the shield and engaging with a tooth of the ratchet, turns the ratchet the space of one tooth. This it continues to do until the ratchet reaches such position that the pawl in its back stroke drops over or back of the projecting tooth 75, when the pawl will move the ratchet during the whole of its forward stroke.

Projecting from the rock-shaft 5 is an arm, 82, connected by a link, 83, with a slide-bar, 84, from which extend through slots 85 in the table 71 pins 86, the bar 84 sliding in suitable ways. The long tooth 75 is so located with respect to the pawl 12 and the wheel 6 that as the pawl 73 drops behind the tooth 75 the pawl 12 catches into the notch 1, and as the pawl 73 moves forward the pawl 12 drags with it the wheel 6, which, being fixed upon the shaft 5, rocks said shaft and draws forward the slide-bar 84 and its pins 86. The bags, as delivered by the roller 59, drop in front of these pins 86, and when the pins 86 move forward they push forward the pile or piles of accumulated bags; and as this takes place once during the rotation of the wheel 75, and this wheel is turned at each rotation of the carrier 40, it follows that the piles are pushed forward whenever a given number of bags have been formed.

In the mechanism shown the ratchet has twenty-five teeth, and as four bags are formed at each rotation of the carrier the pins 86 at each advance will press forward one hundred bags, in two piles of fifty each, side by side. This obviates all necessity of counting the bags or of providing the machine with a stop-motion to stop it when a certain number of bags have been made, as by my method the machine can keep at work indefinitely, the accumulating piles being pressed forward, and being removed by an attendant whenever desirable.

As the pawl 12 moves forward and is reaching the end of its stroke a pin, 19, extending laterally from it, strikes a stationary pin, 87, which raises the pawl from its notch, and a suitable spring then returns the shaft 5, slide 84, and pins 86 to their normal positions.

The machine may be made with provision for printing each bag, and for this purpose a part of each of the bed-plates 58 is preferably arranged to yield, and the pressing-roller 59 will be provided with types 88, all as shown in Fig. 4. In such arrangement a part of each bed-plate 58 is hinged, as seen at 89, and the two are connected by a link, 90. When the hinged part of the bed-plate strikes the pressing-roller 59 said roller forces in the same, over which the paper is drawn, and in forcing it in forces out the hinged part of the opposite plate. After the plate passes the roller it is held in (to hold the opposite plate in position for the action of the cutter-bar) by guides 91, under which the ends of the plates pass after leaving the roller.

To insure proper rotative movement of the pressing-roller 59 when the types 88 are used, it is provided with a gear-pinion, 92, meshing into and driven by the tooth-wheel 70.

The types may be supplied with ink by any suitable inking mechanism.

In the operation of the machine the web of paper passes from the paper-roll 30 over a guide-roller, 31, and thence over the cylinder 32, bringing its under surface at the edges into contact with the perimeters of the paste-wheels 29 28, said wheels applying paste intermittingly, as before described, or so that only half of each bag-forming length is pasted by them. Then, as the paper passes between the turning-fingers 26 27, they form a narrow edge fold or lap, which fold or lap in the paste-applied part will adhere to the surface against which it is folded as the paper continues its progress over the guide-rollers 33 34. From the roller 34 the paper passes over the cylinders 35, and the outer surface of the inwardly-turned laps at its edges passes against the perimeters of the paste-wheels 45 46, by which paste is continuously applied to such surfaces. Thence the paper passes to and under the guide-roller 36, to and over the carrier 40, down between it and the carrier 50, being by the mechanisms of said carriers doubled or folded at the center of each bag-forming length and severed for such length, the two halves or plies of the bag and the paste-supplied edge laps thereof being brought together, and adhering to form the bag as they pass between the pressing-roller 59 and the bed-plate 58, the completed bag being delivered upon the table 71, from which the accumulating bags are removed by the pins 86.

The removable paste-troughs are constructed with compartments 80, in which the twin cylinders run, so that while the paste-wheels may dip into the paste said cylinders will not.

I claim—

1. The combination of a revolving carrier, provided with a folding or creasing blade for doubling the paper, with a revolving carrier provided with a pair of nipping-jaws, between which the paper is doubled and seized, and a pressing feeding-roller, substantially as described.

2. The combination, with mechanism for severing a web of paper, of a revolving carrier provided with a folding or creasing blade for doubling the paper, a revolving carrier provided with a pair of nipping-jaws, between which the paper is doubled and seized, and a pressing-roller, all substantially as described.

3. The combination of a cutting mechanism for severing a web of paper into lengths and a rotating paper-folding mechanism, all substantially as described.

4. The combination of a cutting mechanism for severing a web of paper into lengths, a folding or creasing blade mounted in a revolving carrier for doubling the same, and a revolving carrier furnished with devices which seize, retain, and carry the doubled paper, all substantially as specified.

5. The combination of a mechanism for severing a web of paper into lengths, a mechanism for controlling the severed paper and delivering it within the range of action of folding mechanism, and a rotating paper-folding mechanism, all substantially as described.

6. The combination of a mechanism for automatically controlling the leading end of the paper and delivering it within the range of action of the folding mechanism with a rotating folding mechanism, all substantially as specified.

7. The combination, with a folding or creasing blade, of a revolving carrier provided with a pair of nipping-jaws, and a cutting mechanism coacting with said jaws in severing the web of paper, all substantially as specified.

8. A revolving carrier furnished with one member of a cutting device and with one member of a folding device, in combination with co-operating cutting and folding mechanisms, substantially as described.

9. A pair of revolving carriers, each provided with one member of a cutting device and one member of a folding device, adapted for co-operation, substantially as specified.

10. The combination of two revolving carriers, one of which is provided with a folding or creasing blade for doubling the paper, and the other with a device which grasps or nips the folded paper, said carriers being also furnished with cutting devices which sever the paper into lengths, all substantially as specified.

11. The combination, with a folding or creasing blade, of a revolving carrier provided with a pair of nipping-jaws and a cam, 65, one of which jaws is fixed to and forms part of said carrier, while the other jaw is provided with a rock-arm, 63, and operated by said cam 65, substantially as described.

12. The combination, with a pair of revolving carriers, one of which is provided with a folding or creasing blade and one member of a cutting device, and the other of which is provided with nipping-jaws and a member of a cutting device, of paper-holding pins and mechanism for withdrawing said pins from the paper, all substantially as described.

13. The combination, with a pair of revolving carriers, one of which is provided with a folding or creasing blade and paper-holding pins, and the other with nipping-jaws, of mechanism for automatically disengaging the pins and paper, so that the latter, when it is delivered, shall not be torn by the pins, all substantially as described.

14. The combination, with a mechanism for severing a web of paper transversely, so as to detach a portion of and provide the web with a free leading end, of a web-supporting revolving carrier provided with pins that impale and temporarily hold and carry said leading end, and a rotating mechanism coacting with said carrier for delivering the detached portion, all substantially as described.

15. The combination, with carrying-rollers, by which a web of paper is conducted, of a pasting-wheel constantly supplied with paste, and running in contact with said web, and a doctor or scraper for removing the paste from said wheel at certain intervals of time, whereby a broken line of paste is applied to the surface of said paper, substantially as described.

16. The combination, with the carrier 50 and the pressing-roller 59, of the bed-plate 58, part of which is hinged, and the plate 7 and cutter-bar 11, substantially as described.

17. The combination, with carriers 40 50 and mechanisms supported by them for folding the paper, of the elastically-seated pressing-roller 59, all substantially as described.

18. The combination, with a folding or creasing blade having portions of its edge removed, of nipping-jaws coacting therewith, one of which jaws is provided with an elastic lip, whereby said jaws operate to seize the doubled edge of the paper between the protruding portions of said blade, all substantially as described.

19. The combination, with a revolving carrier provided with a folding or creasing blade having portions of its edge removed, of a companion revolving carrier provided with nipping-jaws, one of which has an elastic lip, whereby said jaws operate to seize the doubled edge of the paper between the protruding portions of said blade, all substantially as described.

20. The combination, with the rotating carriers and folding mechanism supported thereby, of the slacker-bars 56, substantially as described.

21. In combination with the paste-wheels 28 29, the doctor or scraper intermittingly brought into contact with such wheels, substantially as described.

22. The combination of the ratchet 74, pawl 73, guard 22, pawl 12, wheel 6, and rock-shaft 5, for operating the bag-removing mechanism, substantially as described.

23. The combination of the paste-wheels 28 29, the intermittingly-acting doctor or scraper 25, the turning-fingers 26 27, and rollers 31 33, substantially as and for the purposes set forth.

24. The combination of the paste-wheels 45 46 with the carriers 40 50, substantially as shown and described.

25. The carrier 40, provided with the folding or creasing blades 20, and cutter-bars 11, in combination with the carrier 50 and its nipping-jaws 17 18 and plates 7, substantially as shown and described.

26. The combination, with a paste-wheel the edge of which is constantly supplied with paste, of a doctor or scraper operating intermittingly to remove the paste from the edge of said wheel, all substantially as described.

27. The combination, with a revolving carrier provided with the cutter-bar 11, of a revolving carrier provided with the adjustable plate 7, substantially as described.

28. The combination, with the carrier 40, of the pins 2, their shaft 16, rock-arms 15, and detent 13, substantially as described.

29. The combination, with mechanism for folding a running web of paper longitudinally and a mechanism for severing the same transversely, of a rotating folding mechanism co-operating therewith to impart transverse folds to said paper, all substantially as described.

30. The combination, with mechanism for folding a running web of paper longitudinally, mechanism for severing the same transversely, and a rotating folding mechanism co-operating therewith to impart transverse folds to said paper, of an interposed roller, as 33, to lay the longitudinal fold, all substantially as described.

31. The combination, with a revolving carrier provided with a mechanism for holding the paper at the line of doubling and carrying the same onward, of a pressing feeding-roller coacting therewith, all substantially as described.

In witness whereof I have hereunto affixed my name in the presence of two subscribing witnesses.

LUTHER C. CROWELL.

Witnesses:
G. W. GREGORY,
N. E. WHITNEY.